May 19, 1970 J. H. BREAR 3,512,557
FLUID SWITCHING DEVICES
Filed Jan. 20, 1967
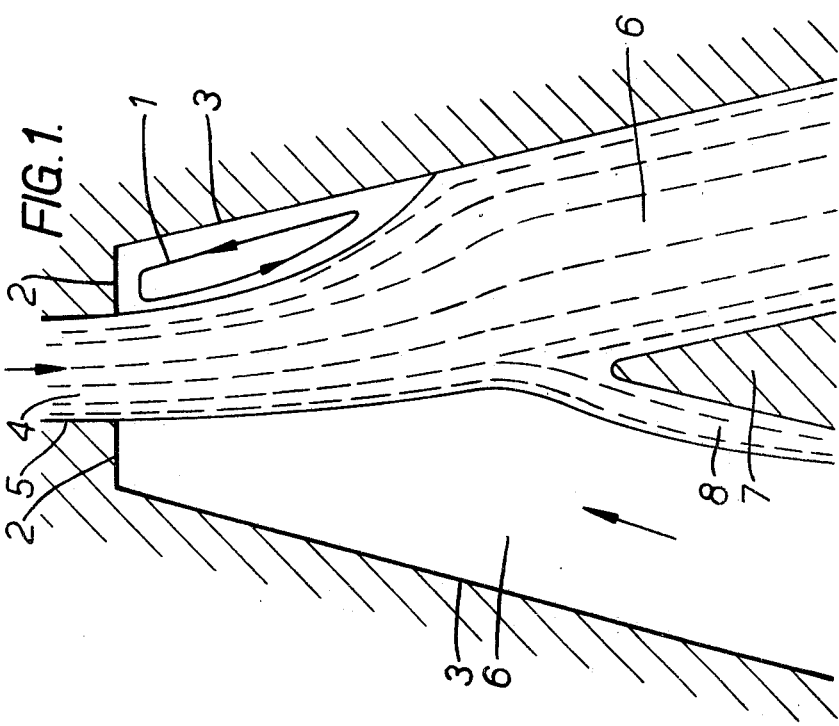
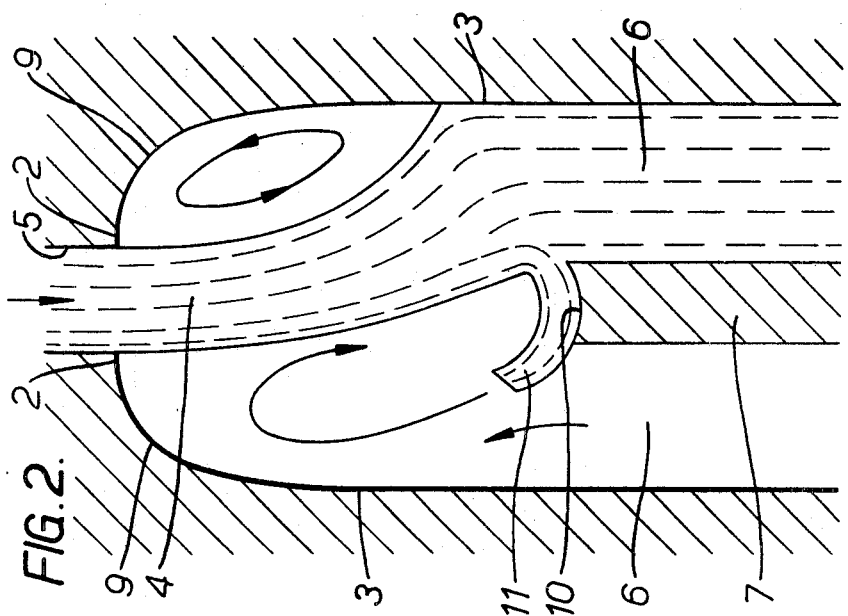
INVENTOR
JOHN HARRY BREAR
By: Norris Bateman
Atty.

3,512,557
Patented May 19, 1970

3,512,557
FLUID SWITCHING DEVICES
John H. Brear, Newport, England, assignor to Serck R. & D. Limited, Warwickshire, England, a British company
Filed Jan. 20, 1967, Ser. No. 610,644
Claims priority, application Great Britain, Jan. 21, 1966, 2,856
Int. Cl. F15c 1/08, 4/00
U.S. Cl. 137—81.5    4 Claims

ABSTRACT OF THE DISCLOSURE

A bi-stable fluid switching device the geometry of which is modified to provide more efficient operation, by making the outside walls run parallel to the axis of the nozzle and rounding out the junctions between the outside walls and the end walls on either side of the nozzle.

---

This invention relates to bi-stable fluid switching devices of the kind in which a stream of fluid issuing from an input nozzle is periodically diverted from one to the other of a pair of output passages separated by a fluid splitter, by alternately attaching the fluid stream to opposite side walls of the device.

The strength and persistence of the attachment of the stream to each side wall is governed by the strength of the vortex occuring between that wall and the fluid stream upstream of the point of attachment.

In a typical device of the kind referred to and shown diagrammatically in FIG. 1, the vortex 1 occupies a narrow wedge-shaped space bounded on the outside by an end wall 2 and a divergent side wall 3 which tend to elongate the vortex and resist the rotational flow of fluid therein.

It is the object of the invention to reduce the resistance to rotational flow of the vortex and thus strengthen it by altering the geometry of the device and to this end, according to the invention, rounded junctions are provided between the end and side walls and the latter are made to extend parallel to the axis of the nozzle.

The invention will be described in more detail with reference to a bi-stable switching device for automatically directing a flow of fluid in a filter system through each in turn of a pair of parallel-connected fluid lines each containing a filter for removing entrained solid matter from the fluid, while means responsive to the pressure or suction conditions in the system automatically directs a backflushing flow of fluid through the temporarily inoperative one of said filter elements to displace solid matter adhering thereto.

In one filter system of this kind the fluid lines, each containing a filter element, extend in parallel between upstream and downstream junctions, of which the former is of divergent configuration and takes the form of the bi-stable switching unit shown diagrammatically in horizontal section in FIG. 1, in which an incoming stream 4 of fluid to be filtered issuing from a nozzle 5 is automatically directed through one or other of a pair of fluid passages 6 separated by a splitter 7 and each connected to one of said fluid lines (not shown). Upon reaching the downstream junction (not shown) which is connected to an outlet, a proportion of the filtered fluid, due to its momentum or to suction at the switching unit, flows into the other line and displaces solid matter adhering to the temporarily inoperative filter element therein. The buildup of solid matter on the temporarily operative filter element causes the pressure upstream thereof to increase until it reaches a value at which the bi-stable unit switches the incoming fluid stream 4 to the other fluid line and the action is then reversed.

The strength of attachment of the fluid stream 4 to one or other side wall 3 of the switching unit depends on the strength of the vortex 1 which in turn depends, among other things, on the width of the adjacent end wall 2, the angle made by the end wall with the associated side wall 3 and the distance of the end of the splitter 7 from the nozzle 5.

When using mesh filters of relatively high resistance to flow in such a system there is a tendency for a part 8 of the incoming stream 4 to leak down the backflow side of the splitter 7, cancelling out the backflow and preventing the dirty filter from being cleaned.

In order to strengthen the vortex and so eliminate leakage by strengthening the attachment of the fluid stream to one or other side wall, a switching unit of the kind shown in diagrammatic horizontal cross-section in FIG. 2 of the accompanying drawing may be employed. Compared with the unit shown in FIG. 1 it will be seen that the end walls 2 have been widened and curved to form rounded junctions 9 with the side walls 3 which latter now extend parallel to each other and to the axis of the nozzle 5. The curvature of each junction 9 is preferably such that a circle of diameter equal to the distance of each side wall from the adjacent side of the nozzle 5 may be accommodated on each side of the fluid stream 4. In addition the end of the splitter 7 is preferably provided with a concave surface 10.

The curved configuration of the junctions 9 improve the flow shape of the vortex 1 and reduce the resistance to rotation of the fluid therein, and the parallel walls 3 ensure that the distance from the centre line of the unit to each side wall is constant over the whole of the area of attachment of the fluid stream, all of which will tend to pass through one or other of the passages 6. Any fluid still tending to leak down the backflow side of the splitter 7 will be deflected by the concave surface 10 of the splitter, in the manner shown at 11 in FIG. 2, whereby it assists in the entrainment of backflowing fluid to enable even fine-mesh filters to be cleaned.

I claim:
1. A bi-stable fluid switching device comprising means defining an input nozzle, a fluid splitter disposed in substantial axial alignment with and downstream of said nozzle, and a pair of output passages at opposite sides of said splitter for alternately receiving a stream of fluid issuing from said nozzle, opposite sides of said splitter defining the inner side walls of said pair of passages, outer side walls for said passages each comprising a longitudinal surface extending downstream of the point of attachment of the fluid stream substantially parallel to the axis of said nozzle and in spaced relation and alongside and opposite said inner side walls, means providing oppositely directed lateral surfaces extending from a side of said nozzle substantially at right angles to the nozzle axis, and arcuate surfaces smoothly joining said lateral surfaces and the longitudinal surfaces of each outer passage wall.

2. A fluid switching device according to claim 1, wherein said inner side walls of the output passage are substantially parallel to each other.

3. A fluid switching device according to claim 1, wherein the configuration of each said outer side wall is such that the space on each side of the nozzle upstream of the point of attachment of the fluid stream is large enough to accommodate a circle of diameter equal to the transverse distance of each longitudinal side wall surface from the adjacent side of the nozzle.

4. A fluid switching device according to claim 3, wherein a concave surface is provided on the end of said splitter facing said input nozzle.

References Cited

UNITED STATES PATENTS 3,170,476  2/1965  Reilly _____ 137—815
3,216,439  11/1965 Manion _____ 137—815

SAMUEL SCOTT, Primary Examiner